United States Patent

[11] 3,604,378

| [72] | Inventor | Wilbur F. McDaniel, Jr.<br>1704 Acoma St., Ponca City, Okla. 74601 |
|---|---|---|
| [21] | Appl. No. | 19,433 |
| [22] | Filed | Mar. 13, 1970 |
| [45] | Patented | Sept. 14, 1971<br>Continuation-in-part of application Ser. No. 804,812, Mar. 6, 1969, now abandoned. |

[54] GRASSLAND PLANTER
12 Claims, 6 Drawing Figs.

[52] U.S. Cl. ................................................ 111/85,
172/427, 172/583, 172/678
[51] Int. Cl. .................................................. A01c 5/06,
A01b 63/16, A01b 25/00
[50] Field of Search ............................................. 111/85, 52,
6; 172/184, 595, 581–584, 599, 186, 427, 776,
536, 678

[56] References Cited
UNITED STATES PATENTS

| 708,150 | 9/1902 | Koppervd ..................... | 172/186 |
| 1,628,372 | 5/1927 | Strandland ................... | 172/536 X |
| 2,919,754 | 1/1960 | Walberg ....................... | 172/678 X |
| 2,921,640 | 1/1960 | Roppel ......................... | 111/85 X |
| 3,526,342 | 9/1970 | Pechacek ..................... | 111/6 X |

Primary Examiner—Robert E. Pulfrey
Assistant Examiner—Stephen C. Pellegrino
Attorney—William A. Mikesell, Jr.

ABSTRACT: The present invention is generally useful in supplying fluent materials to the surface of the earth and has primary utility for planting grains, such as wheat, over grassland to provide winter pasture for livestock. In one form, apparatus embodying certain features of this invention may include a rectangular frame having a longitudinal axis and a front and a rear end. A plurality of earth-cutting means, such as disks, may be mounted underneath the frame adjacent the front end thereof with each of the disks aligned along an axis mounted at an angle to the longitudinal axis of the frame. A reservoir, such as a seed and fertilizer box, may be provided, preferably above and adjustable longitudinally with respect to the front gang of disks, and a plurality of channel means, such as seed and fertilizer tubes, may be provided extending from the lower portion of the seed box to a position near and above the lower edge of the disks. Means for pressing the seeded furrows may be provided adjacent the rear end of the frame; and in a preferred embodiment such furrow-pressing means may comprise a plurality of aligned disks, each of which is offset in its relationship to a corresponding disk in the front disk gang. Ground support means, such as a plurality of fluid filled tires, depend from the frame at an intermediate position on the frame between the front disk gang and the furrow-closing disks.

Means are provided to adjust the relative vertical position of the front disk gang and the furrow closing disks around the ground support means. In addition, as an optional feature of this invention there may also be provided an outrigger assembly extending from the rear end of the frame for minimizing side drift of the apparatus.

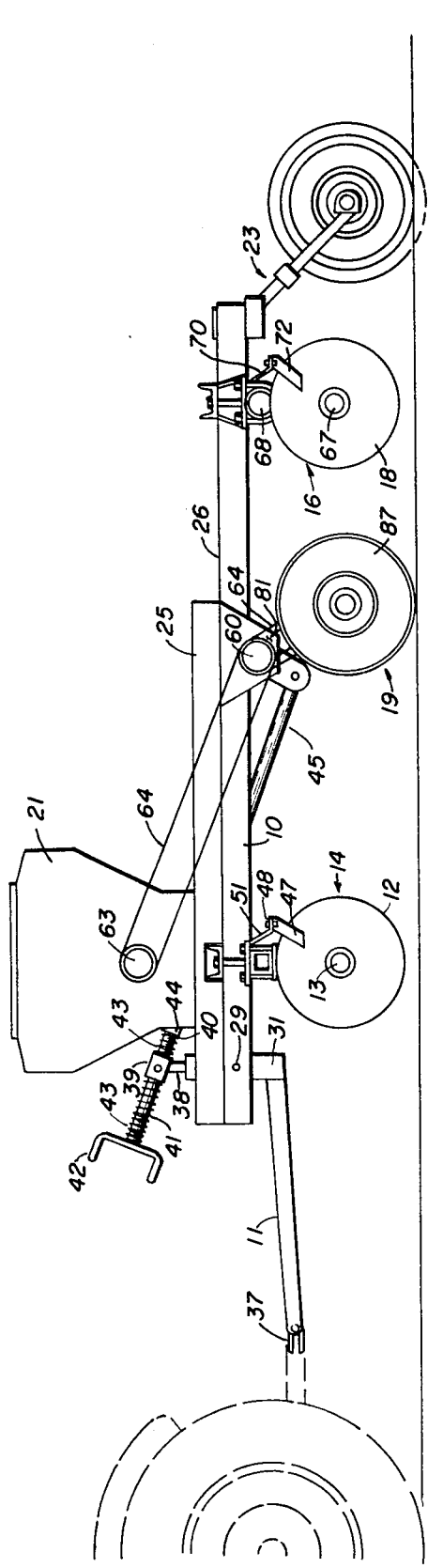
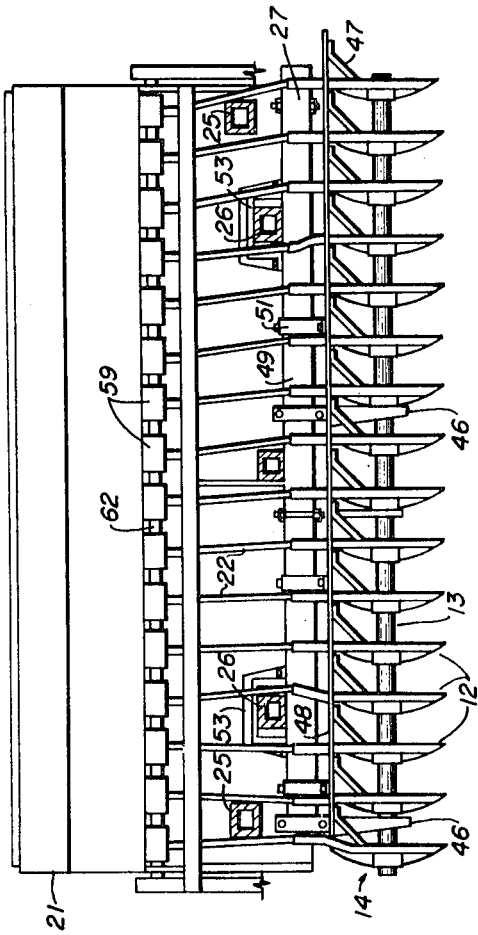
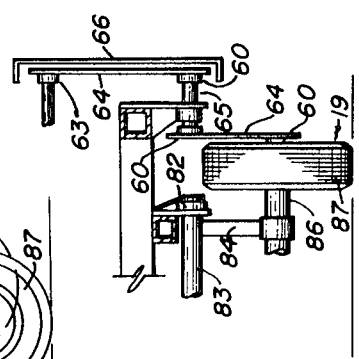
INVENTOR.
WILBUR F. McDANIEL, JR.
ATTORNEY

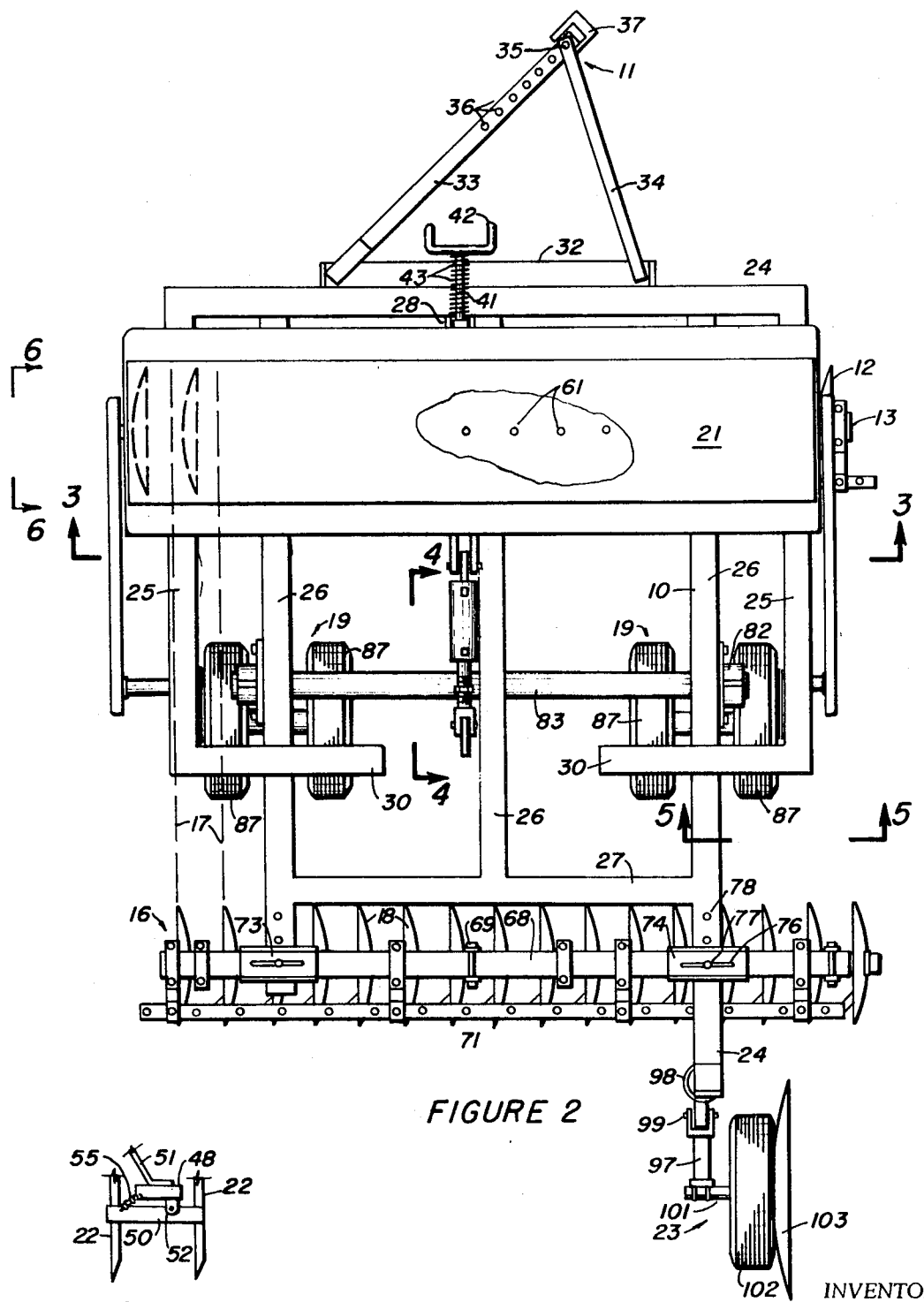

1

GRASSLAND PLANTER

CROSS-REFERENCES TO RELATED APPLICATIONS

This application is a continuation-in-part of my copending Ser. No. 804,812, filed Mar. 6, 1969, now abandoned.

BACKGROUND OF THE INVENTION

One of the problems which has confronted cattlemen for many years has been the problem of providing winter forage for their herds. With the onset of winter the grasslands which sustain the herds during spring, summer, and fall cease to be renewed and become dormant. Thus forage is not renewed during the winter and grazing pressure must be reduced to avoid damage to the range land. Because of the necessity for reduction in grazing pressure, it is necessary to provide other means for feeding the livestock.

In order to provide a better balanced forage ration and also in order to alleviate pressure on grass (preferably bermuda) grazing areas during the winter, it is common practice for livestock to be placed on pasture of small grains, such as winter wheat, or legumes, such as vetch, during a portion of the winter months. As a limitation on this practice, however, is the fact that, commonly, small grain pasture will not exist contiguously with the grasslands where livestock are commonly grazed. Moreover, even where range and small grains land do exist side by side, it is necessary to limit the number of livestock on the small grains and also to limit the period during which the wheat is subjected to grazing in order to prevent damage to the wheat. Thus, although small grains provide a certain amount of green forage to livestock herds during the winter, the utility of such pasture is restricted.

To the casual observer it may appear that there is an obvious solution to this need for winter forage—"If small grains are a suitable forage crop during the winter months," he may ask, "then why not drill small gains onto the grasslands solely for the purpose of providing winter pasture?" As a matter of fact this possibility has long intrigued cattlemen since it has the obvious advantage of extending the use of their range land and in many cases would avoid the necessity for transporting cattle to distance pasture.

In spite of the obvious advantages to be gained from providing small grains on grasslands, no successful apparatus for planting the small grains has, until the present invention, been provided. The reason for this failure lies in the nature of the grassland pasture. It was at one time thought, for instance, that the well-known chisel-type drill might be utilized for this purpose; however, it was soon discovered that the use of this type of apparatus on grassland was unsatisfactory because of the presence of relatively large submerged rocks, roots, and woody growth which characterize grasslands in many areas. When using the chisel-type drills on land of this type, it was found that the chisels would be rendered inoperative in a very short time due to the presence of these obstacles, thus precluding the application of this type of equipment to range land.

From the chisel-type drill, ranchers turned to the well-known disk-type planters. This, at the time, appeared to be an obvious step since when the disks encountered submerged rocks and woody growth which would destroy a chisel they would, theoretically at least, simply ride over the obstruction and continue in a preselected path. Here again, however, the nature of the grassland precluded the use of this type of equipment. More particularly, when set for planting the disk-type drills will not penetrate bermuda grass sod without a shank which is subject to the same shortcomings which characterize the chisel-type drill. Thus, it was impossible to use the standard-type disk drill on grassland, and this type of drill is, like the chisel drill, useless for the desired purpose.

Until the present invention apparatus capable of efficiently planting and fertilizing grain seeds or untilled grassland pasture has remained an elusive desideratum.

DESCRIPTION OF THE DRAWINGS

Apparatus embodying one form of the invention claimed herein is disclosed in the following description which is to be read in conjunction with the accompanying drawings wherein like reference characters designate like parts in all views and wherein:

FIG. 1 is a side view of one form of apparatus useful in practicing the present invention showing a hitch adjusting mechanism;

FIG. 2 is a plan view of the apparatus set forth in FIG. 1 showing the relative alignment between front and rear gangs of disks;

FIG. 3 is an end elevational view taken along line 3–3 of FIG. 2 showing the relationship between a seed box and a disk gang;

FIG. 4 is a side elevational view of a portion of the apparatus taken along line 4—4 of FIG. 2, with certain elements omitted, showing alternate positions of support wheels which are adjusted by a hydraulic cylinder;

FIG. 5 is an end elevational view of a portion of the apparatus taken along line 5—5 of FIG. 2, with certain elements omitted, showing a mechanism for driving the seed box feed; and FIG. 6 is a side elevational view of a portion of the apparatus taken along line 6—6 of FIG. 2, with certain elements omitted, showing a safety mechanism for the seed and fertilizer tubes.

GENERAL DESCRIPTION OF THE APPARATUS

Turning now to the drawings, the major components of the present invention may be seen to include a rigid horizontal frame 10 at the front end of which is provided a hitch assembly 11. Behind hitch assembly 11, near the front portion of frame 10, is carried a plurality of earth cutting means which, in the embodiment shown, are in the form of disks 12. Disks 12 are aligned along shaft 13 to provide a disk gang, indicated generally by the numeral 14.

Furrow pressing means in the form of disk gang 16 is mounted on the underside of frame 10 adjacent the rear portion thereof. As shown by the dotted lines 17 in FIG. 2, individual disks 18 in gang 16 are offset in relationship to corresponding disks 12 in the front disk gang 14 from about 1 to about 1 ½ inches in order to press the furrows formed in the earth by disks 12.

Ground support means, such as a wheel assembly 19, is mounted on the underside of frame 10 at a position slightly behind the center of the area between gang 14 and gang 16.

A reservoir, such as a seen and fertilizer box 21, is adjustable secured above gang 14 and a plurality of channels, such as seed and fertilizer tubes 22 (FIG. 3), lead from the bottom of box 21 to a point adjacent the underside of each disk 12.

As an optional feature of the preset invention an outrigger assembly, indicated generally by the numeral 23, may be secured to a projection 24 of frame 10 located at one corner of the rear edge thereof. Outrigger assembly 23 functions to reduce any tendency of the apparatus to deviate from a line of travel parallel to the longitudinal axis of frame 10.

DETAILED DESCRIPTION OF THE APPARATUS

A more detailed examination of the structure shown in the drawings reveals that frame 10 comprises a plurality of longitudinal beams 26, the center one of which is located upon the longitudinal axis of frame 10. A pair of crossbeams 27 are provided to give rigidity to the structure, one being located at the front of the frame, while the other is located adjacent the rear thereof.

A second frame comprising a transverse frame beam 24, a pair of longitudinal frame beam 25, and a pair of rear transverse frame beams is removably secured by means of bolts or clamps not shown to longitudinal beams 26. Seed and fertilizer box 21 is mounted on beams 25 so as to be slidable toward the front or rear of the device. This permits the weight distribution with respect to wheels 87 to be adjusted for varying conditions of the pasture being treated, and further permits box 21 and beams 24, 25 and 30 to be lifted, as an assembly, off beams 26 to allow use of the lower portion of the device alone as a disk plow.

Hitch assembly 11, which may be adjusted to control the depth of planting, is secured to frame 10 through a downwardly projecting bracket 28 which depends from frame 10 below the center beam 26. Pivotally secured to bracket 28 by a pin 29 is a bellcrank 31 which carries on one end thereof a spreader bar 32.

FIG. 2 reveals that at either end of spreader bar 32 are pivotally secured a pair of adjustable adjustable hitch elements 33 and 34 which are secured together at their opposite end by a locking pin 35 projecting through one of a plurality of apertures 36 formed in hitch element 33 and a corresponding aperture in element 34. A hitching clevis 37 is carried at the end of the hitch element 33.

At the end of bellcrank 31 opposite spreader bar 32 there is provided a collar bracket 38 to which is pivotally secured a collar 39. Mounted within collar 39 is a rotary shaft 41 which is threaded as at 40. The threaded portion of shaft 41 projects into the end of a hollow arm 45, which is threaded internally to mate with threads 40, and is operated by a manually operated handle 42 to move shaft 41 relative to arm 45. A pair of compression springs 43 are located along shaft 41 on either side of collar 39 to provide a resilient coupling between the hitch and the wheels. The upper one of the compression springs 43 being held in place by handle 42 while the lower of the springs is held in place by a pair of nuts 44 which may be adjusted upon shaft 41 to alter the compression in springs 43.

The front disk gang 14, which includes disks 12 mounted along shaft 13, is secured to and depends from a horizontal carrier arm 49 by a plurality of brackets 46 (FIG. 3). In combination with each disk 12 there is provided a mud scraper 47 for preventing balling of mud on the disks, scrapers 47 being secured to the underside of a scraper bar 48. A plurality of bracket assemblies 51 depend downwardly and backwardly from arm 49 and function to secure scraper bar 48 thereto. A pair of box clamps 53 are also located on carrier arm 49, near each end thereof, to receive and clamp outside beams 26 which make up frame 10.

Tubes 22 can be mounted on a pivot bar 50 which in turn is carried by a pivot bracket 52 mounted on scraper bar 48 and urged into the positions shown by a spring 55. This allows the tubes to be pushed temporarily out of the way by debris lodged on a disk 12.

Box clamps 53 may be adjusted to allow sliding motion of carrier arm 49 along frame 10 for the purpose of moving one end of disk gang 14 relative to the other end to provide the proper disk angle for forming a furrow. A plurality of apertures (not shown) may be provided in beam 26 for the purpose of locking disk gang 14 in position by means of a pin (not shown) after the gang has been properly positioned.

Mounted slidably and with suitable clamping means on the beams 25 is seed and fertilizer box 21. On the bottom of the box are located a plurality of agitator housings 59 each of which is indexed with an aperture 61 formed in the bottom of seed and fertilizer hoppers to receive seed and fertilizer therefrom. Within each housing 59 there is provided a rotary shaft 62. Bearings for shaft 62 are provided, while on each end of shaft 62 is keyed a sprocket wheel 63. Rotary motion is provided to sprocket wheels 63 by chains 64 which are driven from wheels 87 by means of jack shafts 65 and sprockets 60. A chain guard 66 can be provided around chain 64.

It may now be seen that seed and fertilizer tubes 22 communicate with the interior of agitator housings 59 and receive seed and fertilizer therefrom.

The rear disk gang 16 is substantially identical in structure to the front disk gang and includes the plurality of disks 18 already mentioned which are rotatably secured to an axle 67. Axle 67 rides below a horizontal carrier arm 68 and is secured thereto by a plurality of brackets 69 (FIG. 2). Brackets 69 are preferably designed to allow disk gang 18 to swing rearwardly of the position shown, around arm 68, for certain uses of the device. Likewise secured to carrier arm 68 by means of scraper bar brackets 70 is a scraper bar 71 which positions a plurality of mud scrapers 72 adjacent disks 18. Carrier arm 68 is held on frame 10 by a pair of box clamps 73 and 74 which, as in the case of the box clamps 53, are slidably secured on beams 26. In addition, clamp 74 is slotted as indicated at 76 to receive a locking pin 77 which engages one of a plurality of adjusting apertures 78 to lock the right-hand portion of disk gang 16 in position, as viewed in FIG. 2.

Wheel assembly 19 is located slightly behind the midpoint between gangs 14 and 16, preferably a distance behind the midpoint equal to from about 5 percent to about 25 percent of the total distance separating the two gangs and assembly 19, and comprises a pair of journal brackets 81 which depend from the outer edge of the outside beams 26. Journal bearings 82, carried by brackets 81, support a rocker shaft 83 from which depend a pair of wheel supports 84 beneath each of the outer beams 26. At the lower end of each of the wheel supports 84 is provided a horizontal wheel axle 86 on which are rotatably mounted two fluid filled wheels 87.

As shown in FIG. 4, movement of rocker shaft 83 may be provided by a hydraulic cylinder 88 which is pivotally secured to a bracket 89 carried by the central frame member 26. The push rod 91 of cylinder 88 is pivotally journaled through a clevis 92 to an operating lever 93 which moves as a unit with, and imparts motion to, rocker shaft 83. A portion of push rod 91 is threaded and carries a stopnut 94 which is positioned upon the push rod in order to control the position of wheels 87 during operation of the apparatus by limiting the distance push rod 91 can return into cylinder 88.

A tie bracket 96 depends from the central portion of rocker shaft 83 and is rigidly secured thereto and moves therewith. An end of arm 45 is pivotally secured to tie bracket 96 so that motion of the shaft 45 imparted by handle 42 causes rotation of rocker shaft 83 through the typing connection of bracket 96. Since rocker shaft 83 is restrained from rotation by the linkage associated with cylinder 88, the resulting thrust on bracket 96 causes the entire machine mounted on frame 10 to tilt about the axles 86 of wheels 87 because of the fixed elevation of clevis 37 and pivoting action about pin 29.

The optional outrigger assembly 23 includes axle support means made up of a mounting arm 97, which is hinged as indicated generally by the numeral 99 for vertical motion. The upper end of arm 97 joins frame extension 24 at a horizontal joint 98 which is designed to allow clockwise, but not counterclockwise, motion of assembly 23 from its position as shown in FIG. 2. At the lower end of mounting arm 97 is provided a wheel shaft 101 which rotatably secures a fluid filled wheel 102. Immediately adjacent wheel 102 and also mounted on shaft 101 there is provided a disk 103 which has a diameter greater (preferably from about 4 to about 8 inches greater) than the diameter of wheel 102. By this arrangement limited penetration of disk 103 into the ground is provided by the stop action of the smaller diameter wheel which assumes the bearing load of the outrigger assembly.

OPERATION

Before utilizing the apparatus described above, front gang 14 should first be set at a shallow angle (from about 5° to about 15°) with the longitudinal axis of frame 10. In addition, hitch assembly 11 and wheel assembly 19 should be positioned to allow front disk gang 14 to extend approximately 2 inches into the ground while the rear disk gang 16 rides just on the surface of the ground. In this position the grass encountered by disks 12 will be split and pushed aside but not rolled over thereby allowing a more complete closing of the seed furrow when pressed by disks 18.

In the event that an unusually hard surface is to be sowed it is desirable to increase the weight on front gang 14. This is accomplished by clockwise rotation of handle 42 whereby the distance between collar 39 and tie bracket 96 is reduced thereby lowering hitching clevis 37 and raising wheel assembly 19 to affect a weight increase on disk gang 14. Weight distribution can also be adjusted by shifting seed and fertilizer box 21 toward the front or rear of the device on beams 25.

A basic and essential concept of the present invention resides in the combination of adjustments which enables the depth of cut to be maintained constant, even during rapid transitions between hard and soft ground. This is accomplished by adjusting the force on arm 45 in conjunction with the bias on wheel assembly 19 provided by cylinder 88. Specifically, the 'tilt' of the device about the axis of shaft 83 is set by spring 43, and the horizontal height or cutting depth of the disks is maintained by wheels 19.

As the apparatus is pulled across the surface of the ground the front gang is maintained at a depth of 2 inches into the soil while, ideally, the rear gang travels along the surface. Seeds and fertilizer in box 21 pass downwardly through tubes 22 and are discharged in a freshly opened furrow immediately adjacent each disk 12. A continuous supply of seeds and fertilizer from box 21 is insured due to the action of the agitators within housings 59 which prevent bridging of the material therein. As known in the art, the ratio of seed to fertilizer supplied from box 21 is adjustably controlled by internal gearing in box 21, and of course the device can be used to apply either seed or fertilizer alone as desired, if both seed and fertilizer are not to be applied simultaneously. A suitable combination box 21 is, for example, an International Harvester combination grain and fertilizer drill, model 10.

If, because of abnormal operating conditions, the apparatus tends to crawl or side drift due to the planes of rotation of disks 12, the outrigger assembly 23 may be utilized. As disks 12 are positioned in FIG. 2 side drift would tend to be to the left as viewed in this figure. In order to follow side drift, outrigger assembly 23 would tend to rotate counter clockwise in relationship to frame 10. However horizontal hinge 98 is constructed so as to prevent such counterclockwise motion of outrigger assembly 23 with the result that the outrigger assembly is prevented from tracking to accommodate for drift. The reaction of disk 103 against the ground produces a compensating forcecouple for the action of disk gang 14 thereby minimizing side drift.

It should be recognized that parts have equivalent or similar function can be substituted for certain of those of the invention. For example, the disks 18 of rear gang 16 can be replaced by presser wheels, as is known in the art. Also, front gang 14 can comprise a pair of split axles 13 mounted, in plan view, such that the gang forms a forward-pointing "vee" rather than a canted line.

From the above description it will be seen that the present invention provides apparatus for sowing grains on grasslands. It should be understood that the embodiment described herein is presented by example of example only and that many changes and modifications thereto can be made without departing from the spirit of the invention and from the scope of the annexed claims.

What is claimed is:
1. A drill comprising;
  a. a frame having a longitudinal axis and a front and a rear end;
  b. a plurality of earth-cutting means mounted below and adjacent the front end of said frame, said earth-cutting means being aligned along an axis at an angle to the longitudinal axis of the frame;
  c. a reservoir situated on said frame above said plurality of earth-cutting means;
  d. a plurality of vertical channel means communicating with the interior of the reservoir near the bottom thereof, the lower end of each of said channel means being disposed to position material from the reservoir immediately behind an earth-cutting means;
  e. furrow-pressing means mounted on said frame near the rear portion thereof in a position to close furrows opened in the earth by said earth-cutting means;
  f. vertically adjustable ground support means located on said frame intermediate the earth-cutting means and the furrow-closing means;
  g. hitch means pivotally secured to said frame near said front end, said hitch means being provided at its end nearest said frame with a vertically offset connection means; and
  h. tilt-adjusting means pivotally and operatively connected from said offset connection means to a location on said drill, said location being offset vertically and longitudinally from said offset connection means, to adjust the relative vertical position of the earth-cutting means and the furrow-pressing means.

2. The apparatus defined in claim 1 together with an extension from the rear end of the frame in horizontal direction and an outrigger assembly secured to said extension for engaging the ground to stabilize motion of the drill over the ground.

3. The apparatus defined in claim 2 wherein said outrigger assembly comprises a rotary wheel, support means secured to said wheel and to said extension from the frame, and a circular disk carried by said support means immediately adjacent said wheel and affixed thereto to rotate with said wheel, the diameter of said disk being larger than the diameter of said wheel.

4. The apparatus defined in claim 3 wherein the support means is provided with a hinge mechanism to allow arcuate vertical motion of the wheel and disk.

5. The apparatus defined in claim 1 wherein each of the earth-cutting means comprises a dish-shaped disk and wherein the reservoir is mounted above the disks.

6. The apparatus defined in claim 5 wherein the reservoir comprises a seed and fertilizer box and wherein the channel means comprise seed and fertilizer tubes, said box shiftable longitudinally of said frame.

7. The apparatus defined in claim 6 wherein the furrow-pressing means comprises of a plurality of dish-shaped disks aligned along an axis at an angle to the longitudinal axis of the frame and wherein disks of the furrow-pressing means are offset along a line normal to the longitudinal axis of the frame with regard to corresponding disk which form the earth-cutting means.

8. The apparatus defined in claim 1 wherein the ground support means comprises a rocker shaft mounted on the frame perpendicular to the longitudinal axis thereof, a mounting bracket depending from the rocker shaft adjacent each end thereof, an axle located at the end of the mounting bracket, said axle being secured to the mounting bracket at its center, and a pneumatic tire mounted for rotation on each end of each of the axles.

9. The apparatus defined in claim 8 wherein said adjusting means comprises a tongue assembly pivotally secured to the front end of the frame, a bellcrank secured to and located near the central portion of the rocker shaft, a collar pivotally carried at the rear end of the tongue assembly, a threaded adjusting rod passing through the collar and pivotally secured to the bellcrank, and means carried by one end of the threaded rod for rotating the rod whereby the bellcrank and collar are moved toward and away from each other.

10. The apparatus defined in claim 9 together with an extension from the rear end of the frame in a horizontal direction and an outrigger assembly secured to said extension for engaging the ground to stabilize motion of the seed drill over the ground.

11. The apparatus defined in claim 10 wherein said outrigger assembly comprises a rotary wheel, support means secured to said wheel and to said extension from the frame, and a circular disk carried by said support means immediately adjacent said wheel and affixed thereto to rotate with said wheel, the diameter of said disk being larger than the diameter of said wheel.

12. The apparatus defined in claim 11 wherein the support means is provided with a hinge mechanism to allow arcuate vertical motion of the wheel and disk.